US008567043B2

(12) United States Patent
Horst et al.

(10) Patent No.: US 8,567,043 B2
(45) Date of Patent: Oct. 29, 2013

(54) METHOD OF ASSEMBLING LOW NOISE ROTOR OR STATOR OF AN ELECTRIC MOTOR OR GENERATOR

(75) Inventors: Gary E. Horst, Manchester, MO (US); Daniel E. Bailey, Ballwin, MO (US); Daniel E. Hilton, St. Louis, MO (US); Gregory M. Levine, St. Louis, MO (US); L. Ranney Dohogne, Creve Coeur, MO (US)

(73) Assignee: Nidec Motor Corporation, St. Louis, MO (US)

( * ) Notice: Subject to any disclaimer, the term of this patent is extended or adjusted under 35 U.S.C. 154(b) by 249 days.

(21) Appl. No.: 12/890,298

(22) Filed: Sep. 24, 2010

(65) Prior Publication Data

US 2011/0140567 A1 Jun. 16, 2011

Related U.S. Application Data

(60) Provisional application No. 61/286,305, filed on Dec. 14, 2009.

(51) Int. Cl.
*H02K 1/14* (2006.01)
*H02K 15/02* (2006.01)
*H02K 15/12* (2006.01)

(52) U.S. Cl.
USPC .................. 29/596; 29/598; 310/216.009

(58) Field of Classification Search
USPC ............... 29/596, 598; 310/216.008, 216.009
See application file for complete search history.

(56) References Cited

U.S. PATENT DOCUMENTS

| 4,433,080 | A | * | 2/1984 | Laganis et al. ................ 523/414 |
| 5,973,432 | A | | 10/1999 | Katagiri et al. |
| 6,608,734 | B1 | | 8/2003 | Herndon et al. |
| 2004/0068857 | A1 | * | 4/2004 | Park et al. ....................... 29/596 |
| 2007/0241629 | A1 | | 10/2007 | Ionel et al. |
| 2008/0256783 | A1 | | 10/2008 | Alfermann et al. |

FOREIGN PATENT DOCUMENTS

| EP | 0881755 A2 | 12/1998 |
| WO | 2005006517 A1 | 1/2005 |

* cited by examiner

*Primary Examiner* — Livius R Cazan
(74) *Attorney, Agent, or Firm* — Hovey Williams LLP

(57) ABSTRACT

A stator or rotor of an electric motor or generator comprises a core formed of ferromagnetic material having a plurality of teeth arranged circumferentially about an axis. In one aspect of the invention, at least one retaining member connects the end portions of at least two of the teeth to each other in a manner inhibiting relative movement between said tooth end portions. By inhibiting relative movement between said tooth end portions, vibration is reduced. Vibration can also be reduced by welding interior surfaces of a core to each other. Reducing the vibration reduces the noise emissions of the rotor or stator during operation.

5 Claims, 6 Drawing Sheets ative movement between the teeth of the rotor or stator. The
METHOD OF ASSEMBLING LOW NOISE ROTOR OR STATOR OF AN ELECTRIC MOTOR OR GENERATOR

CROSS-REFERENCE TO RELATED APPLICATIONS

This application claims priority to U.S. Provisional Patent Application Ser. No. 61/286,305, filed on Dec. 14, 2009, which is hereby incorporated by reference in its entirety.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention pertains generally to electric motors and generators. More specifically, this invention pertains to the reduction of noise generated by a stator or rotor, which is partially caused by relative movement between the teeth of the rotor or stator as teeth pass through non-constant magnetic flux fields. The invention increases the stiffness between the teeth in a manner inhibiting the relative movement.

2. General Background

Electric motors and generators are primarily comprised of a rotor and a stator. The stator may encircle the rotor or vice versa. Alternatively, the rotor and stator may lie axially side by side. In operation, at least one of these components creates fluctuating magnetic fields by passing fluctuating electrical currents through windings. Such a component typically comprises a generally circular ferromagnetic core that has a plurality of radially extending teeth. Each tooth is encircled by a winding that induces a magnetic field throughout the tooth. The magnetic forces acting on each tooth fluctuates during operation and, as a result, each adjacent pair of teeth experience forces that at some times force the pair of teeth toward each other and at other times away from each other. This causes vibration within the rotor or stator, which in turn generates undesirable audible noise.

SUMMARY OF THE INVENTION

The present invention is aimed at reducing or inhibiting relative movement and vibration of the teeth of stators and rotors. This is achieved by mechanically connecting the free ends of the teeth to each other and/or by stiffening the body portion of the core via one or more welds.

In one aspect of the invention, a stator or rotor of an electric motor or generator comprises a core, a plurality of windings, and at least one retaining member. The core is formed of ferromagnetic material and has a circular body and a plurality of teeth. The circular body defines a central axis. The axis defines radial and circumferential directions. The teeth are arranged circumferentially about the axis. Each of the teeth extends radially from the circular body to a respective tooth end portion. Each of the windings extends around a respective one of the teeth in a manner such that the winding lies radially between the tooth end portion of the respective tooth and the circular body. The retaining member connects the tooth end portions of at least two of the teeth to each other in a manner inhibiting relative movement between said tooth end portions.

In another aspect of the invention, a method of assembling a stator or rotor of an electric motor or generator comprises a step of attaching at least one retaining member to a core of the stator or rotor. The core is formed of ferromagnetic material and has a circular body and a plurality of teeth. The circular body defines a central axis. The axis defines radial and circumferential directions. The teeth are arranged circumferentially about the axis and each of the teeth extends radially from the circular body to a respective tooth end portion. The stator or rotor also comprises a plurality of windings. Each of the windings extends around a respective one of the teeth in a manner such that the winding lies radially between the tooth end portion of the respective tooth and the circular body. The retaining member connects the tooth end portions of at least two of the teeth to each other in a manner inhibiting relative movement between said tooth end portions.

In yet another aspect of the invention, a method of forming a stator or rotor of an electric motor or generator comprises forming a core of the stator or rotor. The core is formed of ferromagnetic material and has a circular body portion and a plurality of teeth. The circular body portion defines a central axis. The axis defines radial and circumferential directions. The teeth are arranged circumferentially about the axis and extending radially outward from the circular body portion. The circular body portion comprises a plurality of interior surfaces that face toward the axis. A slit extends between a pair of the interior surfaces and extends radially outward partially through the circular body portion. The slit has a pair of opposing faces. The method also comprises a step of welding at least portions of the opposing faces of the slit to each other in a manner limiting relative movement between the pair of the interior surfaces and increasing the stiffness of the core.

Further features and advantages of the present invention, as well as the operation of the invention, are described in detail below with reference to the accompanying drawings.

DETAILED DESCRIPTION

Figure 1:
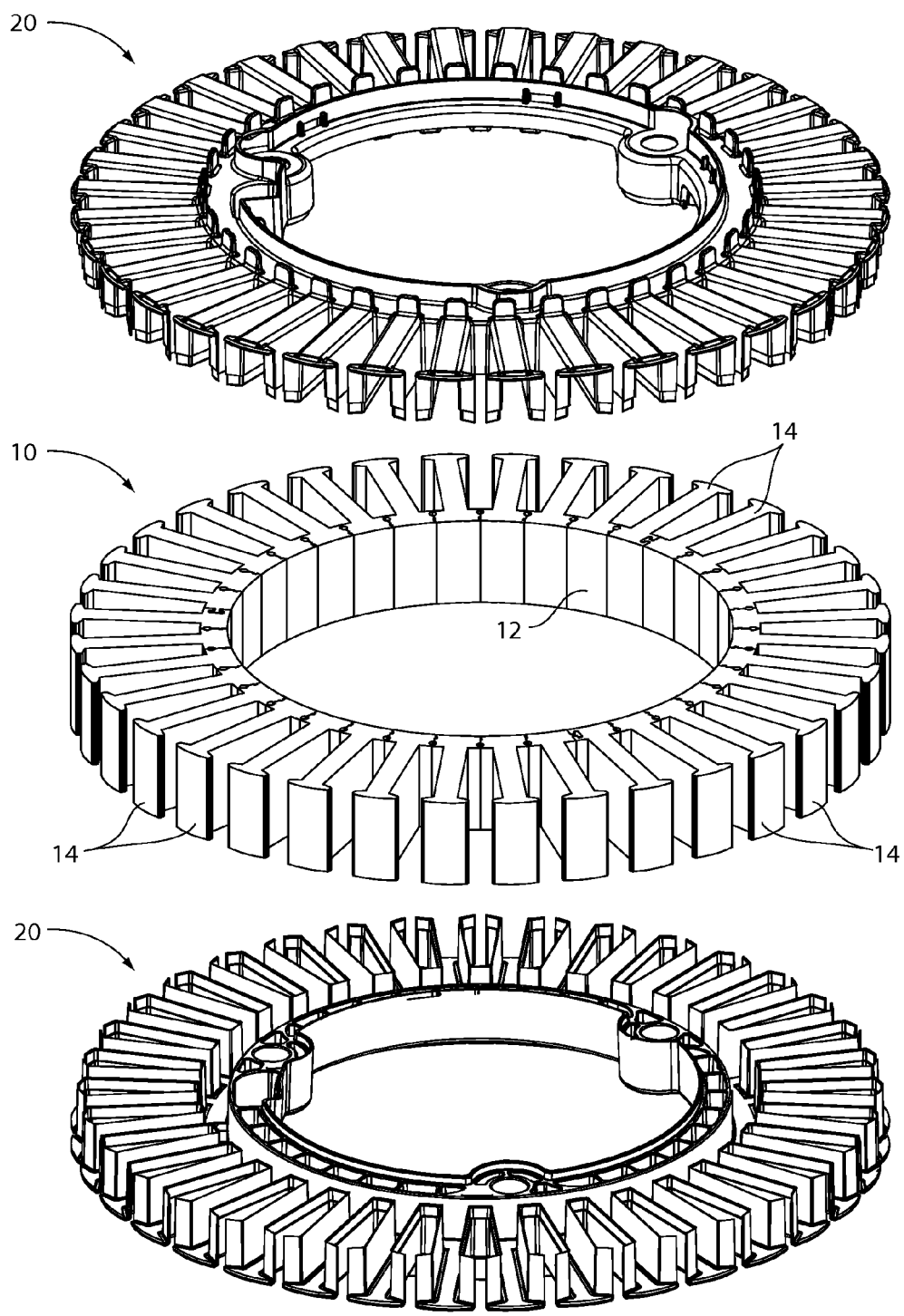
FIG. 1 is a perspective exploded view of a core of a stator or rotor and insulating shrouds that encase the core.

An exemplary embodiment of a core of a stator or rotor in accordance with the invention is shown in FIG. 1 along with insulating shrouds that encase the core. The core 10 is formed of ferromagnetic material and is preferably in the form of a stack of laminations or spirally overlaid laminations. The core 10 has a generally circular body 12 (in this case a ring shaped body) and a plurality of teeth 14 that extend radially from the circular body (in this case radially outward). Each tooth 14 has an end portion 16 opposite the circular body 12 and an intermediate portion 18 that extends from the circular body to the end portion. The intermediate portion 18 of each tooth 14 perpendicularly bisects the tooth's end portion 16 in a manner giving the tooth a T-shaped configuration. Together the insulating shrouds 20 encase the core 10 and electrically shield the core from the windings 22. Each winding 22 (represented by a generally toroidal element in the figures) encircles the intermediate portion 18 of a respective tooth 14.

It should be appreciated that generally circular as used above and in the claims simply means the circular body of the core encircles a central axis. The circular body 12 needs not be perfectly round and could, for example, be polygonal.

The preferred method of reducing relative movement between the teeth 14 of the core 10 utilizes a plurality of plastic retaining members 24. Each retaining member 24 is preferably wedged between the end portions 16 of a respective pair of adjacent teeth 14 and snapped in place. This is explained in greater detail below.

One of the retaining members 24 is shown by itself in FIG. 5-8. The retaining member 24 comprises a plurality of compression protrusions 26 that have load bearing surfaces 28. A wedging surface 30 preferably intersects each load bearing surface 28 and is oriented at an angle relative to the respective load bearing surface. The retaining member 24 also preferably comprises a plurality of generally resilient tabs 32. Each tab 32 comprises a locking protrusion 34. Still further, the retaining member 24 comprises a plurality of blocking protrusions 36 configured to ensure proper positing of the retaining member 24 relative to the core 10.

Figure 2:
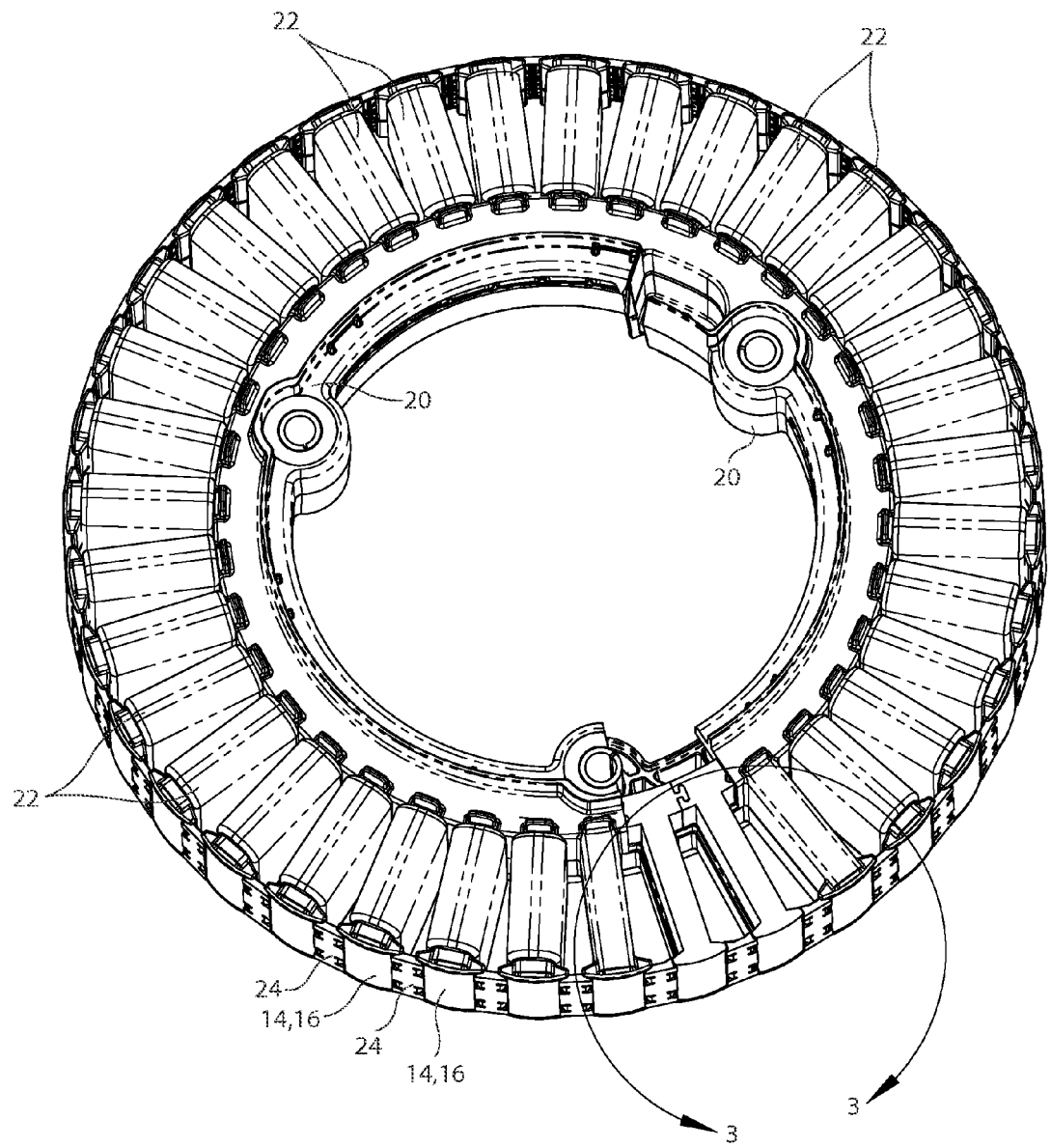
FIG. 2 is a perspective view of an embodiment of the invention with a few of the windings removed and part of one of the insulating shrouds cut-away for purposes of describing the invention.
Figure 3:
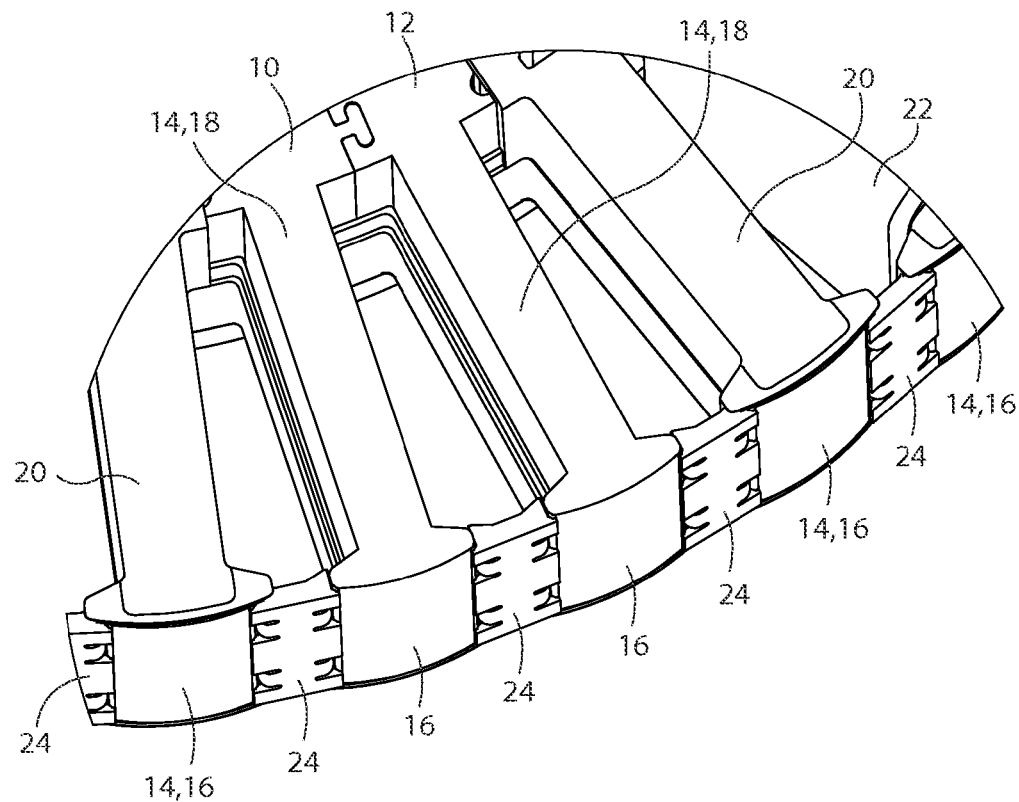
FIG. 3 is detail view of the embodiment of the invention within circle 3-3 shown in FIG. 2.
Figure 4:
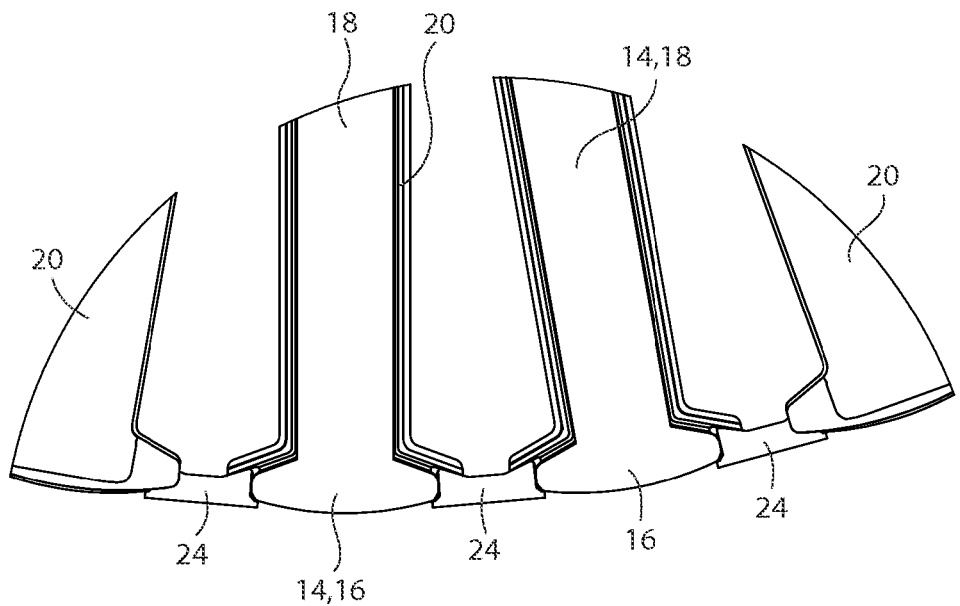
FIG. 4 is detail top plan view showing the tooth end portions of several teeth and a few retaining members of the embodiment of the invention.
Figure 5:
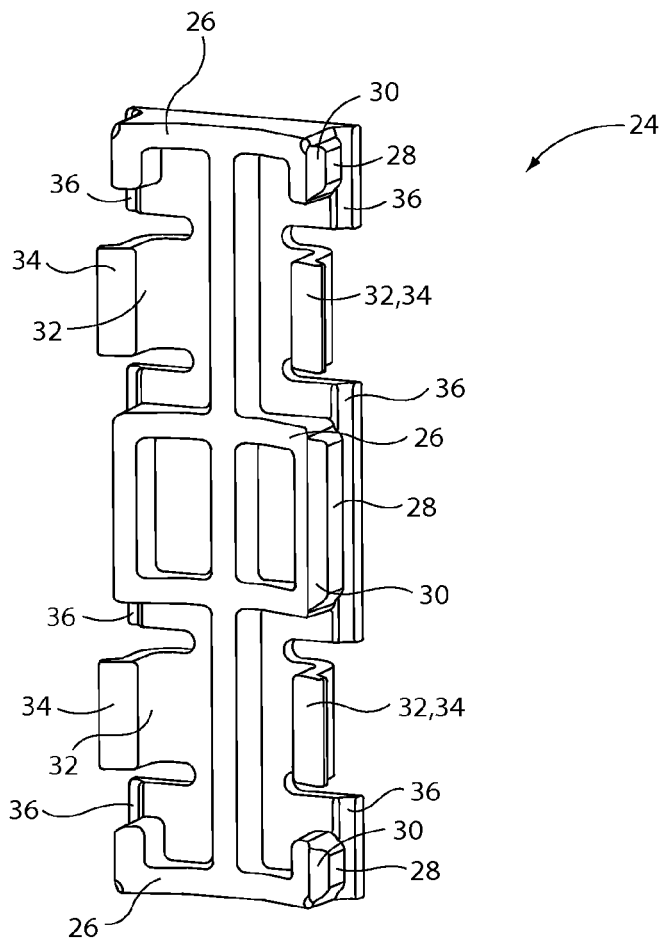
FIG. 5 is a perspective view of a retaining member of the embodiment of the invention.
Figure 6:
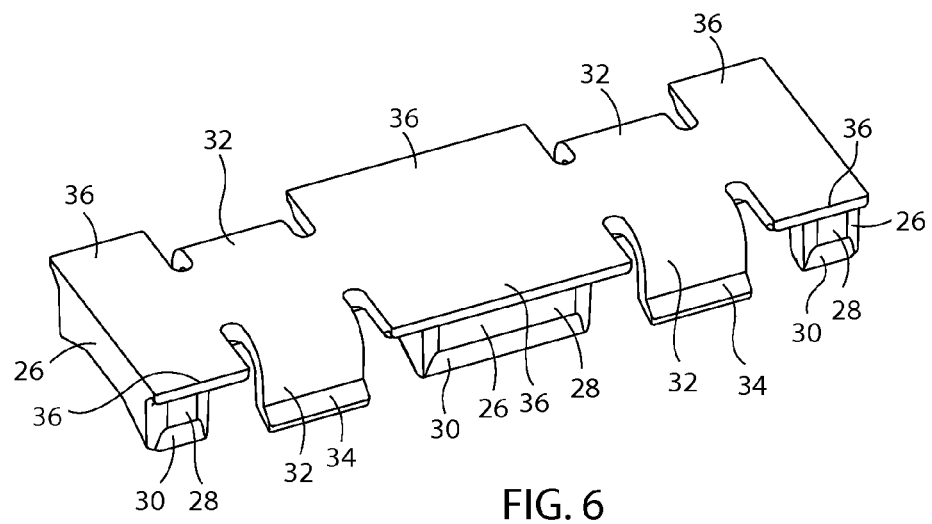
FIG. 6 is another perspective view of the retaining member shown in FIG. 5.
Figure 7:
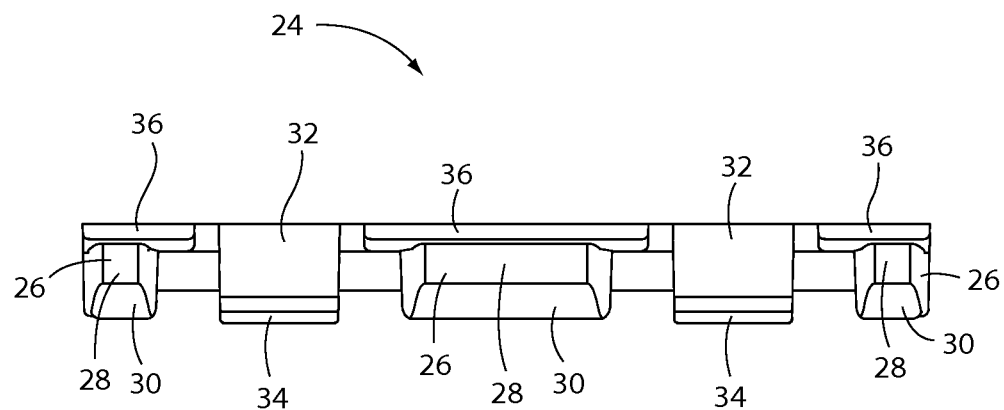
FIG. 7 is a side view of the retaining member shown in FIGS. 5 and 6.
Figure 8:
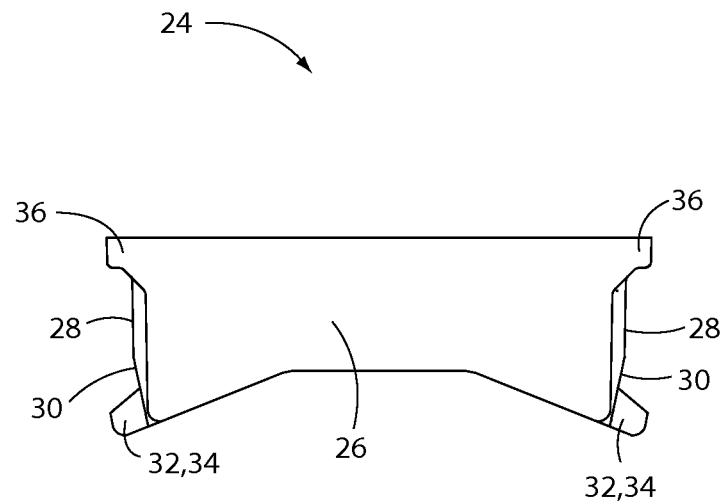
FIG. 8 is a top view of the retaining member shown in FIGS. 5-7.

Each retaining member 24 is configured to be wedged between a respective pair of adjacent teeth 14 of the core 10 as shown in FIG. 2-4. This is done by radially forcing the retaining member 24 against the respective pair of adjacent teeth 14. The wedging surfaces 30 are configured to engage the opposing sides of the end portions 16 of the teeth 14 and to thereby exert an increasing compression force against such opposing sides as the retaining member is pushed into position. Ultimately, the load bearing surfaces 28 of the retaining member engage the opposing sides of the end portions 16 of the teeth 14 and maintain a compressional force against the opposing sides. While the retaining member 24 is being attached to the core 10 as described above, the tabs also engage the opposing sides of the end portions 16 of the teeth 14. As a result, the tabs 32 resiliently defect toward the center of the gap that lies between the pair of teeth 14 as the retaining member 24 is being attached to the core 10. Eventually, the blocking protrusions 36 of the retaining member 24 engage the exterior surfaces of the teeth 14 and thereby prevent any further insertion of the retaining member into the gap that lies between the teeth. When this point is reached, the locking protrusions 36 of the tabs 32 of the retaining member 24 are beyond the sides of the end portions 16 of the teeth 14, which causes the tabs to at least partially resiliently return to their undeflected configuration. This causes the locking protrusions 36 to engage the surfaces of the end portions 16 of the teeth 14 that face the intermediate portions 18 of the teeth, thereby locking the retaining member in place relative to the core 10.

When attached to the core 10 as described above, each retaining member 24 inhibits the respective pair of teeth 14 from moving toward each other. With each adjacent pair of teeth 14 having a retaining member 24 positioned therebetween, the teeth and the retaining members all become locked together and thereby form a structural ring. This greatly reduces the relative movement between any of teeth 14 and, as a result, greatly reduces the amount of noise generated by the rotor or stator during operation.

Although FIG. 3 depicts the stator or rotor with a few windings 22 removed and with the upper insulating shroud partially cut-away, it should be appreciated that the retaining members 24 can be, and preferably are, attached to the stator or rotor after all the windings are in place. As such, it should also be appreciated that the present invention could be added to existing stators or rotors to reduce their noise emissions.

Still further, although the preferred embodiment of the invention utilizes the compression-type retaining members described above, it should be appreciated that the inventors contemplate other ways to inhibit the teeth from moving relative to each other. For example, providing a tension-type retaining member or retaining members can yield generally the same benefits. More specifically, tying the end portions of the teeth of a stator or rotor together via a generally non-stretchable adhesive tape, or via stiff fiber, can inhibit each pair of adjacent teeth from moving away from each other and thereby inhibit the teeth from moving relative to each other. It should also be appreciate that all of the teeth need not necessarily be restrained given that restraining some of the teeth still reduces the noise generated, albeit to a lesser degree.

Figure 9:
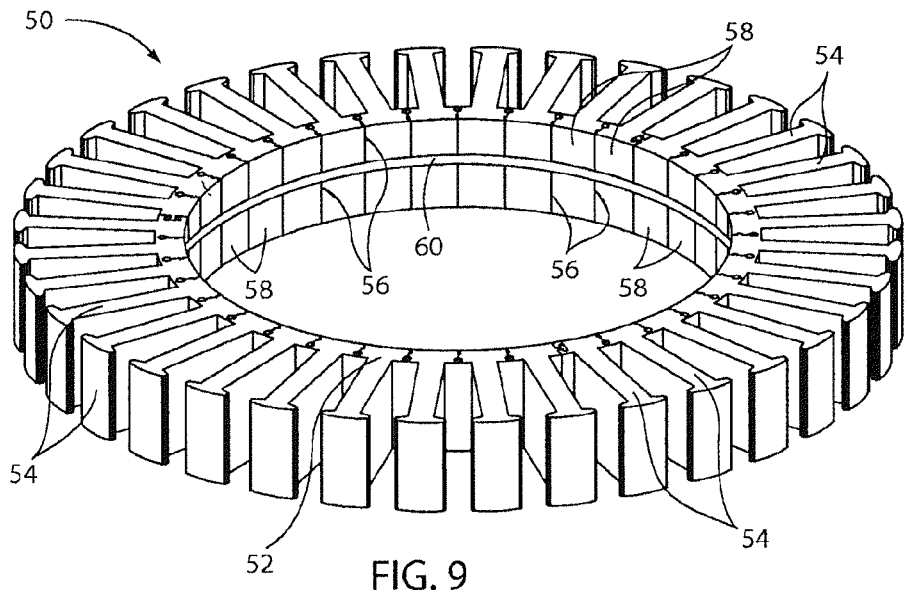
FIG. 9 is a perspective view of the core of a stator or rotor showing another aspect of the invention.
Figure 10:
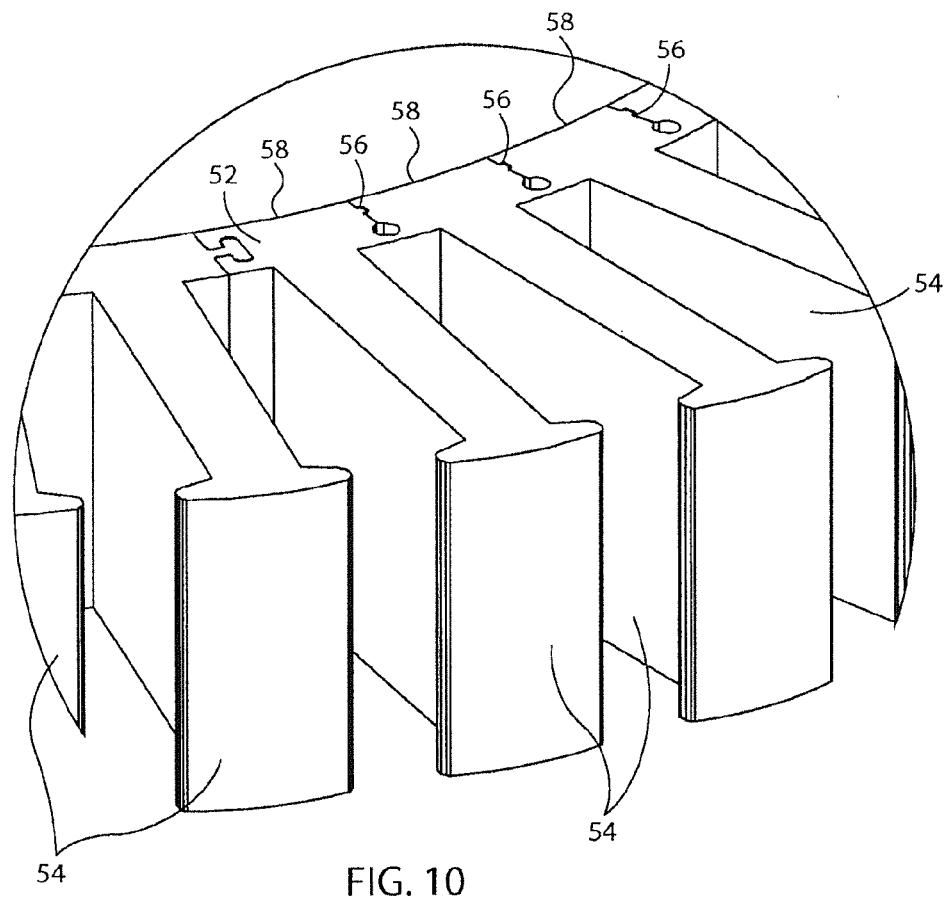
FIG. 10 is a detail view of the core shown in FIG. 9.

FIGS. 9 and 10 depict another embodiment of a method of stiffening the core of a rotor or stator. The core 50 shown in FIG. 9 is similar to the core described above and comprises a circular body portion 52 and a plurality of teeth 54. The teeth 54 extend radially outward from the circular body portion 52. As shown in FIGS. 9 and 10, the manner in which the core is formed creates a plurality of slits 56 that extend radially outward partially through the circular body portion 52 of the core 50. This occurs because the core 50 is preferably formed by bending the laminations that make up the core (which are originally straight) partially around the axis. It should be appreciated that forming the laminations in an initially straight manner results in less scrap material waste during the formation of the laminations. It should also be appreciated that prior to bending the laminations, the slits 56 are formed open, but later close as the laminations are bent. As seen most clearly in FIG. 10, to facilitate the bending, the slits 56 extend radially almost completely through the circular body portion 52. This initially leaves the circular body portion 52 with little stiffness perpendicular to the axis.

As a result of the slits 56, the core 50 comprises a plurality of interior surfaces 58 that form a ring. Each slit 56 extends between a respective pair of adjacent interior surfaces 58. In accordance with one aspect of the invention, the interior surfaces 58 adjacent one of slits 56 are welded to each other. Preferably, an annular bead weld 60 is formed that welds each of the interior surfaces 58 to its adjacent interior surfaces. The bead weld is preferably centrally positioned on the core 50 with respect to the axial direction. By welding an adjacent pair of interior surfaces 58 to each other, the stiffness of the core 50 at the location of the slit 56 that separates such interior surfaces is increased substantially since the interior surfaces are no longer able to move relative to each other. Even though the weld may be relatively axially thin, it effectively negates the impact that the slits 56 would otherwise have on the stiffness of the core 50. This reduces vibration, which reduces the noise emitted by the stator or rotor.

It should be appreciated that the welding aspect of the invention can be used independently or in combination with the retaining member aspect discussed above. Moreover, to further enhance the stiffness of a rotor or stator, the inventors have discovered that a hermitic water-based epoxy varnish applied to the windings of the rotor or stator can reduce vibration of the teeth of the core and thereby further reduce the noise emitted by the rotor or stator.

In view of the foregoing, it should be appreciated that the invention achieves the several advantages over exiting rotor and stator designs.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by the above-described exemplary embodiment, but should be defined only in accordance with the following claims appended hereto and their equivalents.

It should also be understood that when introducing elements of the present invention in the claims or in the above description of exemplary embodiments of the invention, the terms "comprising," "including," and "having" are intended to be open-ended and mean that there may be additional elements other than the listed elements. Additionally, the term "portion" should be construed as meaning some or all of the item or element that it qualifies. Moreover, use of identifiers such as first, second, and third should not be construed in a manner imposing any relative position or time sequence between limitations. Still further, the order in which the steps of any method claim that follows are presented should not be construed in a manner limiting the order in which such steps must be performed. It should be appreciated that generally circular simply means the circular body of the core encircles a central axis. The circular body needs not be perfectly round and could, for example, be polygonal.

What is claimed is:

1. A method of forming a stator or rotor of an electric motor or generator, the method comprising:

forming a core of the stator or rotor, the core being formed of ferromagnetic material and having a circular body portion and a plurality of teeth, the circular body portion defining a central axis, the axis defining radial and circumferential directions, the teeth being arranged circumferentially about the axis and extending radially outward from the circular body portion, the circular body portion comprises a plurality of interior surfaces that face toward the axis, a slit extends between a pair of the interior surfaces and extends radially outward partially through the circular body portion, the slit having a pair of opposing faces;

welding at least portions of the opposing faces of the slit to each other in a manner limiting relative movement between the pair of the interior surfaces and increasing the stiffness of the core, wherein the core comprises a plurality of said slits and each of the slits extends between a pair of the interior surfaces and extends radially outward partially through the circular body portion, each of the slits has a pair of opposing faces, and the step of welding comprises creating an annular bead weld that extends circumferentially around the axis and that joins at least portions of the opposing faces of each of the slits to each other.

2. A method in accordance with claim 1 wherein the slits extend axially through the circular body portion.

3. A method in accordance with claim 1 wherein the core has axially opposite end faces and the bead weld is formed in a manner such that the bead weld lies evenly spaced between the opposite end faces.

4. A method in accordance with claim 1 wherein the stator or rotor also comprises a plurality of windings, each of the windings extends around a respective one of the teeth, and wherein the method further comprises coating the windings with a water-based epoxy varnish.

5. A method in accordance with claim 1 wherein the stator or rotor is a stator.

\* \* \* \* \*